(12) United States Patent
Riemann et al.

(10) Patent No.: US 11,884,554 B2
(45) Date of Patent: Jan. 30, 2024

(54) PROCESS FOR PRECIPITATING A CARBONATE OR (OXY)HYDROXIDE

(71) Applicant: BASF SE, Ludwigshafen am Rhein (DE)

(72) Inventors: Christian Riemann, Ludwigshafen (DE); Thorsten Beierling, Ludwigshafen (DE); Matthias Rauls, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 748 days.

(21) Appl. No.: 17/041,789

(22) PCT Filed: Mar. 21, 2019

(86) PCT No.: PCT/EP2019/057026
§ 371 (c)(1),
(2) Date: Sep. 25, 2020

(87) PCT Pub. No.: WO2019/185433
PCT Pub. Date: Oct. 3, 2019

(65) Prior Publication Data
US 2021/0024371 A1    Jan. 28, 2021

(30) Foreign Application Priority Data
Mar. 27, 2018   (EP) ..................................... 18164399

(51) Int. Cl.
*C01G 53/06*   (2006.01)
*C01G 45/00*   (2006.01)
(Continued)

(52) U.S. Cl.
CPC ........... *C01G 53/06* (2013.01); *C01G 45/006* (2013.01); *C01G 45/02* (2013.01); *C01G 51/04* (2013.01);
(Continued)

(58) Field of Classification Search
None
See application file for complete search history.

(56) References Cited

U.S. PATENT DOCUMENTS 4,519,959 A   5/1985   Takeuchi et al.
4,819,552 A   4/1989   Tazawa et al.
(Continued)

FOREIGN PATENT DOCUMENTS

DE   31 42 410 A1   6/1982
DE   33 13 382 A1   10/1983
(Continued)

OTHER PUBLICATIONS

Extended European Search Report dated Jul. 27, 2018 in European Patent Application No. 18164399.0, 3 pages.
(Continued)

*Primary Examiner* — Sheng H Davis
(74) *Attorney, Agent, or Firm* — Armstrong Teasdale LLP

(57) ABSTRACT

Process for precipitating a carbonate or (oxy)hydroxide comprising nickel from an aqueous solution of a nickel salt wherein such process is carried out in a vessel comprising (A) a vessel body, (B) one or more elements that control the hydraulic flow of the slurry formed during the precipitation and that induce a loop-type circulation flow, and (C) a stirrer whose stirrer element is in the vessel but located separately from the element(s) (B).

8 Claims, 1 Drawing Sheet

(51) Int. Cl.
  *C01G 45/02* (2006.01)
  *C01G 51/04* (2006.01)
  *C01G 51/06* (2006.01)
  *C01G 53/04* (2006.01)
(52) U.S. Cl.
  CPC ............. *C01G 51/06* (2013.01); *C01G 53/04* (2013.01); *C01P 2004/61* (2013.01)

(56) References Cited

U.S. PATENT DOCUMENTS

| 4,889,743 A | 12/1989 | Tazawa et al. |
| 2003/0054251 A1 | 3/2003 | Ohzuku et al. |
| 2007/0009424 A1 | 1/2007 | Ohzuku et al. |

FOREIGN PATENT DOCUMENTS

| EP | 0 299 597 A2 | 1/1989 |
| EP | 1 189 296 A2 | 3/2002 |
| JP | 2004533397 | * 11/2004 |
| JP | 2005029874 | * 2/2005 |
| WO | 2005045958 | * 11/2007 |
| WO | WO 2009/024424 A2 | 2/2009 |
| WO | WO 2012/095381 A2 | 7/2012 |
| WO | WO 2013/117508 A1 | 8/2013 |

OTHER PUBLICATIONS

Kumaresan, T. et al., "Characterization of flow, mixing and particle suspension in alumina draft tube precipitators of taller aspect ratio," Hydrometallurgy, vol. 150, Dec. 2014, pp. 107-122.
International Search Report dated Jun. 14, 2019 in PCT/EP2019/057026 filed Mar. 21, 2019.
International Preliminary Report on Patentability dated Jun. 24, 2020 in PCT/EP2019/057026 filed Mar. 21, 2019.

* cited by examiner

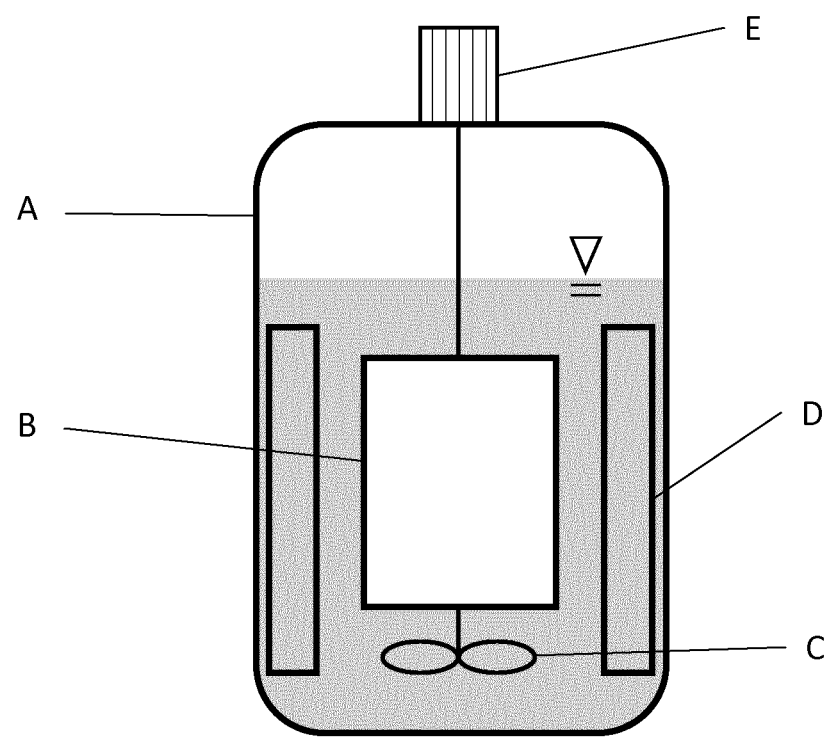

PROCESS FOR PRECIPITATING A CARBONATE OR (OXY)HYDROXIDE

The present invention is directed towards a process for precipitating a carbonate or (oxy)hydroxide comprising nickel from an aqueous solution of a nickel salt wherein such process is carried out in a vessel comprising
(A) a vessel body,
(B) one or more elements that control the hydraulic flow of the slurry formed during the precipitation and that induce a loop-type circulation flow, and
(C) a stirrer whose stirrer element is in the vessel but located separately from the element(s) (B).

Lithium ion secondary batteries are modern devices for storing energy. Many application fields have been and are contemplated, from small devices such as mobile phones and laptop computers through car batteries and other batteries for e-mobility. Various components of the batteries have a decisive role with respect to the performance of the battery such as the electrolyte, the electrode materials, and the separator. Particular attention has been paid to the cathode materials. Several materials have been suggested, such as lithium iron phosphates, lithium cobalt oxides, and lithium nickel cobalt manganese oxides. Although extensive research has been performed the solutions found so far still leave room for improvement.

The electrode material is of crucial importance for the properties of a lithium ion battery. Lithium-containing mixed transition metal oxides have gained particular significance, for example spinels and mixed oxides of layered structure, especially lithium-containing mixed oxides of nickel, manganese and cobalt; see, for example, EP 1 189 296. However, not only the stoichiometry of the electrode material is important, but also other properties such as morphology and surface properties.

Corresponding mixed oxides are prepared generally using a two-stage process. In a first stage, a sparingly soluble salt of the transition metal(s) is prepared by precipitating it from a solution, for example a carbonate or a hydroxide. This sparingly soluble salt is in many cases also referred to as a precursor. In a second stage, the precipitated salt of the transition metal(s) is mixed with a lithium compound, for example $Li_2CO_3$, LiOH or $Li_2O$, and calcined at high temperatures, for example at 600 to 1100° C.

Existing lithium ion batteries still have potential for improvement, especially with regard to the energy density. For this purpose, the cathode material should have a high specific capacity. It is also advantageous when the cathode material can be processed in a simple manner to give electrode layers of thickness from 20 µm to 200 µm, which should have a high density in order to achieve a maximum energy density (per unit volume), and a high cycling stability.

WO 2009/024424 discloses a process for preparing basic transition metal hydroxides, which consists of three steps. These can be characterized as follows:
a) providing at least a first starting solution and a second starting solution,
b) combining at least the first starting solution and the second starting solution in a reactor and producing a homogeneously mixed reaction zone having a specific mechanical power input of at least 2 watts/liter and producing a product suspension comprising insoluble product and a mother liquor which is supersaturated by setting an excess of alkali and has a pH of 10 to 12,
c) partially separating the mother liquor from the precipitated product to set solids contents of at least 150 g/l in the suspension by means of clarification or filtration elements.

However, homogeneous introduction of relatively large amounts of mechanical energy into large volumes of solutions or suspensions is difficult in terms of apparatus.

In WO 2012/095381 and WO 2013/117508, processes for the precipitation of hydroxides or carbonates are disclosed wherein vessels with compartments are used. A lot of energy is introduced in the respective compartment(s). Carrying out said process on commercial scale is difficult, though.

T. Kumaresan et al. disclose an alumina precipitation in draft tubes precipitators, *Hydrometallurgy* 2014, 150, page 107 ff. The stirrer element is placed in said draft tube. However, placing the stirrer in the draft tube makes it extremely difficult to introduce high enough shear forces by keeping a controlled flow in the reactor.

It was an objective of the present invention to provide a process for making cathode active materials for lithium ion batteries which have a maximum volumetric energy density. More particularly, it was therefore an objective of the present invention to provide starting materials for batteries which are suitable for producing batteries with a maximum volumetric energy density. It was a further objective of the present invention to provide a process by which suitable starting materials for batteries can be prepared.

Accordingly, the process defined at the outset has been found, hereinafter also referred to as inventive process or process according to the (present) invention. The inventive process may be carried out as a batch process or as a continuous or semi-continuous process.

The inventive process is directed to a process for precipitating a carbonate or (oxy)hydroxide comprising nickel from an aqueous solution of a nickel salt.

In a preferred embodiment of the present invention, the carbonate or (oxy)hydroxide precipitated according to the inventive process comprises at least one more transition metal selected from manganese and cobalt.

The process according to the invention relates to the preparation of carbonates or (oxy)hydroxides. In the context of the present invention, "hydroxides" refer to hydroxides and do not only include stoichiometrically pure hydroxides but especially also compounds which, as well as transition metal cations and hydroxide ions, also have anions other than hydroxide ions, for example oxide ions and carbonate ions, and/or cations other than transition metal cations.

In one embodiment of the present invention, hydroxides may have 0.01 to 45 mole-% and preferably 0.5 to 40 mole-% of anions other than hydroxide ions, based on the total number of anions. A preferred anion other than hydroxide is carbonate. Sulfate may also be present as an impurity in embodiments in which a sulfate was used as starting material.

In the context of the present invention, "carbonate" does not only include stoichiometrically pure carbonates but especially also compounds which, as well as metal cations and carbonate ions, also have anions other than carbonate, for example oxide ions and hydroxide ions. In the context of the present invention, in "carbonates", the molar amount of carbonate is higher than the sum of molar amounts of all other anions, for example from 60 mole-%, preferably at least 80 mole-%.

In one embodiment of the present invention, carbonate may refer to species that comprise 0.01 to 45 mole-% and preferably 0.5 to 40 mole-% of anions other than carbonate ions, based on the total number of anions. A preferred anion other than carbonate is oxide. Sulfate may also be present as an impurity in embodiments in which a sulfate was used as starting material.

In the context of the present invention, oxyhydroxides may have oxide and hydroxide anions in any molar ratio from 1:10 to 10:1 with the sum of oxide and hydroxide being more than the molar sum of anions other than oxide and hydroxide.

Carbonate or (oxy)hydroxide made according to the inventive process comprises nickel. In a preferred embodiment, carbonate or (oxy)hydroxide made according to the present invention comprise nickel and at least one metal selected from Co and Mn. Preferred are combinations from Ni and Co and Al and combinations from Ni and Co and Mn.

In one embodiment of the present invention, (oxy)hydroxide or carbonate has 0.01 to 20 mol % and preferably 0.2 to 15.0 mol % of cations other than transition metal cations, based on the content of transition metal cations. A preferred non-transition metal cation is $Al^{3+}$.

In one embodiment of the present invention, (oxy)hydroxide corresponds to the general formula (I)

$$Ni_aM^1{}_bMn_cO_x(OH)_y(CO_3)_t \qquad (I)$$

where the variables are each defined as follows:

$M^1$ is Co or combinations of Co and at least one element selected from Ti, Zr, Al and Mg, a is a number in the range from 0.15 to 0.95, preferably 0.5 to 0.9, b is a number in the range from 0.05 to 0.75, preferably 0.1 to 0.4, c is a number in the range from zero to 0.8, preferably 0.05 to 0.65, where $a+b+c=1.0$, $x \leq 1$, preferably $0.3 < x < 1$, $1 < y \leq 2.2$, preferably $1 < y < 2$, $0 \leq t \leq 0.3$.

In other embodiments, $0.5 \leq t \leq 1.0$, $0 \leq y \leq 1.0$, and $0 \leq x < 0.2$.

Many elements are ubiquitous. For example, sodium, copper and chloride are detectable in certain very small proportions in virtually all inorganic materials. In the context of the present invention, proportions of less than 0.01% by weight of cations or anions are disregarded. Any (oxy)hydroxide or carbonate obtained according to the inventive process which comprises less than 0.01% by weight of sodium is thus considered to be sodium-free in the context of the present invention.

In one embodiment of the present invention the inventive process is a process for precipitating a hydroxide or oxyhydroxide with an average particle diameter (D50) in the range of from 2 to 7 μm, preferably 2.5 to 5 μm, determined by light scattering.

In one embodiment of the present invention the inventive process is a process for precipitating a carbonate with an average particle diameter (D50) in the range of from 2 to 7 μm.

The process according to the invention is performed by combining at least one aqueous solution of at least two different metal salts with at least one aqueous solution of at least one alkali metal hydroxide or (hydrogen)carbonate.

In the context of the present invention, aqueous solution of nickel and—optionally—at least one more transition metal selected from manganese and cobalt and—optionally—at least one more cation such as $Al^{3+}$ or $Mg^{2+}$ is also referred to as aqueous solution of transition metals salts for short.

Aqueous solution transition of metal salts comprises a nickel salt. Examples of nickel salts are especially water-soluble nickel salts, i.e. nickel salts which have a solubility of at least 25 g/l and preferably at least 50 g/l, in distilled water, determined at room temperature. Preferred salts of nickel are, for example, salts of carboxylic salts, especially acetates, and also sulfates, nitrates, halides, especially bromides or chlorides, of nickel, the nickel being present as $Ni^{+2}$.

Aqueous solution of transition metal salts may comprise at least one further transition metal salt, preferably two or three further transition metal salts, especially salts of two or three transition metals or of cobalt and aluminum. Suitable transition metal salts are especially water-soluble salts of transition metal(s), i.e. salts which have a solubility of at least 25 g/l and preferably at least 50 g/l, in distilled water, determined at room temperature. Preferred transition metal salts, especially salts of cobalt and manganese, are, for example, carboxylic acid salts, especially acetates, and also sulfates, nitrates, halides, especially bromides or chlorides, of transition metal, the transition metal(s) preferably being present in the +2 oxidation state. Such a solution preferably has a pH in the range from 2 to 7, more preferably in the range from 2.5 to 6. However, Ti and/or Zr, if applicable, are present in an oxidation state of +4. Aluminum is present in the oxidation state of +3, and it may be introduced, e.g., as sodium aluminate or as acetate or sulfate of aluminum.

In one embodiment of the present invention, it is possible to proceed from an aqueous solution of metal salts which comprises, as well as water, one or more organic solvents, for example ethanol, methanol or isopropanol, for example up to 15% by volume, based on water. Another embodiment of the present invention proceeds from an aqueous solution of transition metal salts comprising less than 0.1% by weight, based on water, or preferably no organic solvent.

In one embodiment of the present invention, aqueous solution of transition metal salts used comprises ammonia, ammonium salt or one or more organic amines, for example methylamine or ethylene diamine. Ammonia or organic amines can be added separately, or they can be formed by dissociation of complex salts of transition metal salt in aqueous solution. Aqueous solution of transition metal salts preferably comprises less than 10 mol % of ammonia or organic amine, based on transition metal M. In a particularly preferred embodiment of the present invention, aqueous solution of transition metal salts does not comprise measurable proportions either of ammonia or of organic amine.

Preferred ammonium salts may, for example, be ammonium sulfate and ammonium sulfite.

Aqueous solution of transition metal salts may, for example, have an overall concentration of transition metal(s) in the range from 0.01 to 5 mol/l of solution, preferably 1 to 3 mol/l of solution.

In one embodiment of the present invention, the molar ratio of transition metals in aqueous solution of transition metal salts is adjusted to the desired stoichiometry in the cathode material or mixed transition metal oxide to be used as precursor. It may be necessary to take into account the fact that the solubility of different transition metal carbonates can be different.

Aqueous solution of transition metal salts may comprise, as well as the counterions of the transition metal salts, one or more further salts. These are preferably those salts which do not form sparingly soluble salts with M, or bicarbonates of, for example, sodium, potassium, magnesium or calcium, which can cause precipitation of carbonates in the event of pH alteration. One example of such salts is ammonium sulfate.

In another embodiment of the present invention, aqueous solution of transition metal salts does not comprise any further salts.

In one embodiment of the present invention, aqueous solution of transition metal salts may comprise one or more additives which may be selected from biocides, complexing agents, for example ammonia, chelating agents, surfactants, reducing agents, carboxylic acids and buffers. In another embodiment of the present invention, aqueous solution of transition metal salts does not comprise any additives.

Examples of suitable reducing agents which may be in aqueous solution of transition metal salts are sulfites, especially sodium sulfite, sodium bisulfite ($NaHSO_3$), potassium sulfite, potassium bisulfite, ammonium sulfite, and also hydrazine and salts of hydrazine, for example the hydrogen sulfate of hydrazine, and also water-soluble organic reducing agents, for example ascorbic acid or aldehydes.

Combination is effected with aqueous solution of at least one alkali metal hydroxide, for example by addition of solution of alkali metal hydroxide to aqueous solution of transition metal salts. Particularly preferred alkali metal hydroxides are sodium hydroxide and potassium hydroxide, with sodium hydroxide being most preferred.

In one embodiment of the present invention, the precipitation is brought about by addition of an aqueous solution of sodium hydroxide or potassium hydroxide to an aqueous solution of acetates, sulfates or nitrates of transition metal salts.

In embodiments wherein (oxy)hydroxides are precipitated, it is preferred to control the stoichiometry of salts to hydroxide in a way that the molar ratio of metal to hydroxide is in the range of from 1:2 to 1:2.5.

In embodiments wherein carbonates are precipitated, it is preferred to control the stoichiometry of salts to carbonate in a way that the molar ratio of metal to carbonate is in the range of from 1:1 to 1:1.25.

Aqueous solution of alkali metal hydroxide may have a concentration of hydroxide in the range from 0.1 to 10 mol/l, preferably 1 to 7.5 mol/l.

Aqueous solution of alkali metal hydroxide may comprise one or more further salts, for example ammonium salts, especially ammonium hydroxide, ammonium sulfate or ammonium sulfite. In one embodiment, a molar $NH_3$: transition metal ratio of 0.01 to 0.9 and more preferably of 0.08 to 0.65 can be established.

In one embodiment of the present invention, aqueous solution of alkali metal hydroxide may comprise ammonia or one or more organic amines, for example methylamine.

In another embodiment of the present invention, one or more ammonium salts, ammonia or one or more organic amines may be added separately to the reaction mixture.

The combination can be executed in one or more steps, in each case continuously or batchwise. For instance, solution of alkali metal hydroxide can be fed into the stirred vessel via one or more feed points, and in such a way that the particular feed point is above or below the liquid level. More particularly, metered addition can be effected into the vortex generated by the stirrer in a stirred tank. For instance, it is additionally possible to meter aqueous solution of transition metal salts into the stirred vessel via one or more feed points, and in such a way that the particular feed point is above or below the liquid level. More particularly, metered addition can be effected exactly into the vortex generated by the stirrer in a stirred tank.

In one embodiment of the present invention, an aqueous solution of alkali metal hydroxide is fed into the stirred vessel with several aqueous solutions of one transition metal salt each, each via separate feed points. In another embodiment of the present invention, the combining is performed in such a way that an aqueous solution of alkali metal hydroxide is fed into the stirred vessel with an aqueous solution comprising all transition metals desired for performance of the process according to the invention as salts, each via separate feed points. The latter procedure has the advantage that inhomogeneity in the concentration ratios of the different transition metals can be more easily avoided.

The combination of aqueous solution of transition metal salts with at least one solution of alkali metal hydroxide produces an aqueous suspension of transition metal hydroxide since transition metal hydroxide precipitates out. The aqueous continuous phase, which is also called mother liquor in the context of the present invention, comprises water-soluble salts and optionally further additives present in solution. Examples of possible water-soluble salts include alkali metal salts of the counterions of transition metal, for example sodium acetate, potassium acetate, sodium sulfate, potassium sulfate, sodium nitrate, potassium nitrate, sodium halide, potassium halide, including the corresponding ammonium salts, for example ammonium nitrate, ammonium sulfate and/or ammonium halide. Mother liquor most preferably comprises sodium chloride, potassium chloride or ammonium chloride. Mother liquor may further comprise additional salts, any additives used and any excess alkali metal hydroxide, and also non-precipitated transition metal in the form of transition metal salt.

The pH value of the mother liquor is preferably in the range from 9 to 13, more preferably in the range from 11 to 12.7, measured after cooling the mother liquor to 23° C.

In one embodiment of the present invention, the inventive process can be performed at a temperature in the range from 20 to 90° C., preferably 30 to 80° C. and more preferably 35 to 75° C.

The temperature is determined in the stirred vessel.

It has now been found that the morphology and the surface properties of cathode active materials can be influenced not only in the calcination stage, but also in the stage of production of the respective precursor. For said purpose, the precipitation is carried out in a vessel comprising
(A) a vessel body, hereinafter also referred to as component (A),
(B) one or more elements that control the hydraulic flow of the slurry formed during the process and that induce a loop-type circulation flow, hereinafter also referred to as element(s) (B), and
(C) a stirrer whose stirrer element is in the vessel but located separated from the element(s) (B).

Such components are described in more detail below.

The vessel body may have the appearance of a stirred tank reactor, for example with a height to diameter ratio in the range of from 1 to 3.

The vessel body (A) may be made from duplex stainless steel, molybdenum and copper rich steel alloys or nickel-based alloys.

The vessel described above may additionally include one or more pumps, inserts, mixing units, baffles, wet grinders, homogenizers and stirred tanks working as a further compartment in which the precipitation takes place and preferably having a much smaller volume than the vessel described at the outset. Examples of particularly suitable pumps are centrifugal pumps and peripheral wheel pumps.

In a preferred embodiment of the present invention, though, such vessel is void of any separate compartments, external loops or additional pumps in which a precipitation of a carbonate or a (oxy)hydroxide is carried out.

A further component of the vessel includes one or more elements (B). Such element(s) (B) control(s) the hydraulic flow of the slurry formed during—and as a result of—the precipitation and that induce a loop-type circulation flow.

In a preferred embodiment of the present invention, such elements (B) are selected from draft tubes and guide vanes. Draft tubes are comparable with tubes that are inside the vessel body (A) and whose upper rim or at least one opening is below the gauge of the slurry in the vessel. Thus, slurry circulates through such draft tube. Guide vanes also enable circulation of the slurry.

Guide vanes are usually blade-shaped.

In one embodiment of the present invention, the one or more elements (B) are mounted to the internal surface of the vessel. Preferably, they are mounted to the inner wall with one or more spacers.

In one embodiment of the present invention, the one or more element(s) (B) are mounted between the vessel lid and the vessel side walls, for example mounted to baffles inside the vessel.

In a draft tube, said loop-type circulation preferably goes down inside such element(s) and upwards outside.

Depending on the arrangement of the guide vanes, the circulation may be in any direction.

A stirrer comprises a stirrer element—sometimes also referred to as mixing element—that causes the flow, for example a propeller, and a stirrer shaft. While the stirrer shaft may be located in element (B) the stirrer element (C) is located separately from the element (B), for example above or preferably below element (B). In embodiments with more than one element (B), the stirrer element (C) is located separately from all the elements (B), for example above or preferably below all the elements (B).

In one embodiment of the present invention, stirrer elements (C) are selected from stirrer discs, blades, paddles, and bended cutouts. In a preferred embodiment, stirrer elements are selected from turbines such as Rushton turbines.

In one embodiment of the present invention, the local distance between stirrer elements (C) and element(s) (B) is 0.03 to 1.5 times the diameter of the stirrer element (C).

In one embodiment of the present invention, the ratio of diameter of the draft tube to inner diameter of the vessel body is in the range of from 0.5 to 0.85.

In one embodiment of the present invention, the height of the draft tube is in the range of from 1.0 to 2.5 times the draft tube diameter.

In one embodiment of the present invention, the stirrer element(s) is/are operated at in a way that 0.1 to 20 Watts per liter slurry are introduced while energy input close to stirrer element is by factor 10 to 400 times higher. In this context, liter slurry refers to the total slurry content in the vessel.

The inventive process has the advantage that only a minor average power input is required to frequently expose precursor particles to very high energy dissipation rates close to stirrer element(s) (C). This enables to produce particles with increased density and/or beneficial morphology at moderate overall energy input.

The present invention is further illustrated by working examples and a drawing.

BRIEF DESCRIPTION OF THE DRAWING

A: vessel body
B: a draft tube
C: stirrer element
D: baffles
E: engine for stirrer The drawing is a conceptual one. In the drawing, feeds and the like have been omitted for simplification matters.

Working Example 1

A 50 L stirred vessel was charged with an aqueous solution of $(NH_4)_2SO_4$, 25 g of per kg of solution. The vessel body (A.1) of the vessel was equipped with baffles, a draft tube (B.1) and a Rushton turbine stirrer element (C.1) with a diameter of 0.165 m and placed below the draft tube (diameter 0.23 m).

The temperature of the vessel volume was set to 45° C. The stirrer element was activated and constantly operated at 500 rounds per minute ("rpm", ~2.7 Watt/l). An aqueous solution containing $NiSO_4$, $CoSO_4$ and $MnSO_4$ (molar ratio 6:2:2, total metal concentration: 1.65 mol/kg), an aqueous solution containing sodium hydroxide (25 wt % NaOH) and aqueous ammonia solution (25 wt % ammonia) were simultaneously introduced through different feeds into the vessel. The molar ratio ammonia to transition metals was 0.2. The sum of volume flows was set to adjust the mean residence time to 8 hours. The flow rate of the NaOH was adjusted by a pH regulation circuit to keep the pH value at a constant value of 12.05. The apparatus was operated continuously keeping the liquid level in the reaction vessel constant. A mixed hydroxide of Ni, Co and Mn was collected via free overflow from the vessel. The resulting product slurry contained about 120 g/l hydroxide precursor with an average particle diameter (D50) of 6 μm. The hydroxide was excellently suited as precursor for a lithium ion battery cathode active material.

Working Example 2

The protocol of Working Example 1 was repeated with the following modification: the rotation speed of the Rushton turbine stirrer was set to 300 rpm (~0.6 Watt/l). The resulting slurry contained about 120 g/l hydroxide precursor with an average particle diameter (D50) of 7 μm. The hydroxide precursor was excellently suited as precursor for a lithium ion battery cathode active material.

Working Example 3

The protocol of Working Example 1 was repeated with the following modification: the molar ratio between ammonia and metal was adjusted to 0.4. The resulting product slurry contained about 120 g/l hydroxide precursor with an average particle diameter (D50) of 13.3 μm. The hydroxide precursor was excellently suited as precursor for a lithium ion battery cathode active material.

Working Example 4

The protocol of Working Example 1 was repeated with the following modifications: the molar ratio between ammonia and transition metal was adjusted to 0.4 and the sum of the volume flows was set to adjust the mean residence time to 4 hours. The resulting product slurry contained about 120 g/l hydroxide precursor with an average particle diameter (D50) of 10.6 μm. The hydroxide precursor was excellently suited as precursor for a lithium ion battery cathode active material.

Working Example 5

The protocol of Working Example 4 was repeated with the following modification: the sum of the volume flows was set to adjust the mean residence time to 12 hours. The resulting product slurry contained about 120 g/l hydroxide precursor with an average particle diameter (D50) of 16.4 μm. The hydroxide precursor was excellently suited as precursor for a lithium ion battery cathode active material.

Working Example 6

The protocol of Working Example 1 was repeated with the following modification: A dissolver blade with diameter of 0.2 m was used as stirrer instead of the Rushton turbine. Its rotation speed was set to 500 rpm (~1.7 Watt/l). The sum of volume flows was set to adjust the mean residence time to 4 hours. The resulting slurry contained about 120 g/l hydroxide precursor with an average particle diameter (D50) of 6.6 μm. The hydroxide precursor was excellently suited as precursor for a lithium ion battery cathode active material.

Working Example 7

The protocol of Working Example 6 was repeated with the following modification: The sum of volume flows was set to adjust the mean residence time to 8 hours. The resulting product slurry contained about 120 g/l hydroxide precursor with an average particle diameter (D50) of 8.3 μm. The hydroxide precursor was excellently suited as precursor for a lithium ion battery cathode active material.

Working Example 8

The protocol of Working Example 6 was repeated with the following modification: The sum of volume flows was set to adjust the mean residence time to 12 hours. The resulting product slurry contained about 120 g/l hydroxide precursor with an average particle diameter (D50) of 9.5 μm. The hydroxide precursor was excellently suited as precursor for a lithium ion battery cathode active material.

The invention claimed is:

1. A process for precipitating a carbonate or (oxy)hydroxide comprising nickel from an aqueous solution, the process comprising combining an aqueous solution of at least two different metal salts of which one is a nickel salt with an aqueous solution of an alkali metal hydroxide or (hydrogen) carbonate,
    wherein the process is carried out in a vessel comprising
    (A) a vessel body,
    (B) an element that controls a hydraulic flow of a slurry formed during the precipitating and that induces a loop-type circulation flow, wherein (B) is selected from the group consisting of a draft tube and a guide vane, and
    (C) a stirrer whose stirrer element is in the vessel and located below (B).

2. The process of claim 1, wherein the carbonate or (oxy)hydroxide comprises a transition metal selected from the group consisting of manganese and cobalt.

3. The process of claim 1, wherein the stirrer element of (C) is selected from the group consisting of a stirrer disc, a blade, a paddle, and a bended cutout.

4. The process of claim 1, wherein (B) is mounted to an internal surface of the vessel.

5. The process of claim 1, wherein the vessel comprises a vessel lid and side walls, and wherein (B) is mounted between Rail the vessel lid and the side walls of the vessel.

6. The process of claim 1, wherein the vessel is a stirred tank reactor.

7. The process of claim 1, wherein the vessel does not comprise a separate compartment, an external loop or an additional pump in which precipitation of the carbonate or (oxy)hydroxide is carried out.

8. The process of claim 1, wherein the carbonate or (oxy)hydroxide has an average particle diameter (D50) in a range of from 2 to 7 μm.

* * * * *